(12) United States Patent
Li et al.

(10) Patent No.: US 8,603,935 B2
(45) Date of Patent: Dec. 10, 2013

(54) METHOD FOR MANUFACTURING PHOTOCATALYST MULTIFUNCTIONAL DUST-FREE ACTIVE CARBON COLOR BALL

(75) Inventors: Canghai Li, Ningbo (CN); Rong Zhao, Ningbo (CN); Dizhong Zhang, Ningbo (CN)

(73) Assignee: Ningbo Canghai New Materials Development Co., Ltd., Ningbo, Zhejiang Province (CN)

( * ) Notice: Subject to any disclaimer, the term of this patent is extended or adjusted under 35 U.S.C. 154(b) by 336 days.

(21) Appl. No.: 12/979,267

(22) Filed: Dec. 27, 2010

(65) Prior Publication Data
US 2012/0083403 A1    Apr. 5, 2012

(30) Foreign Application Priority Data
Sep. 30, 2010   (CN) .......................... 2010 1 0299619

(51) Int. Cl.
*B01J 21/18*   (2006.01)

(52) U.S. Cl.
USPC .......................................... 502/182; 502/413

(58) Field of Classification Search
USPC .................................................. 502/182, 413
See application file for complete search history.

(56) References Cited

U.S. PATENT DOCUMENTS 5,856,264 A * 1/1999 Cohen et al. .................. 502/414

* cited by examiner

*Primary Examiner* — Stuart Hendrickson

(57) ABSTRACT

A method for manufacturing photocatalyst multifunctional dust-free active carbon color ball includes the steps of (1) compound-formulating and mixing 8%-15% attapulgite, 8%-15% sepiolite, 5%-10% mordenite and 50%-65% active carbon; (2) after step (1), granulating by adding 5%-10% photocatalyst and appropriate water and mixing; (3) after step (2), drying at 60° C.-80° C. and then grinding till the particle size is smaller than 200 meshes; (4) after step (3), compound-formulating and granulating by adding 5%-10% tourmaline powder and appropriate water; and (5) after step (4), drying at 150° C. and obtaining a product, wherein the percentage of every raw material is expressed by weight. The photocatalyst multifunctional dust-free active carbon color ball can strongly adsorb formaldehyde, benzene, ammonia, sulfur dioxide, carbon monoxide and other harmful toxic polar molecules, and has multiple functions of adsorption, decomposition, releasing negative ions, emitting far infrared, instead of the originally single adsorption function of active carbon.

20 Claims, 1 Drawing Sheet

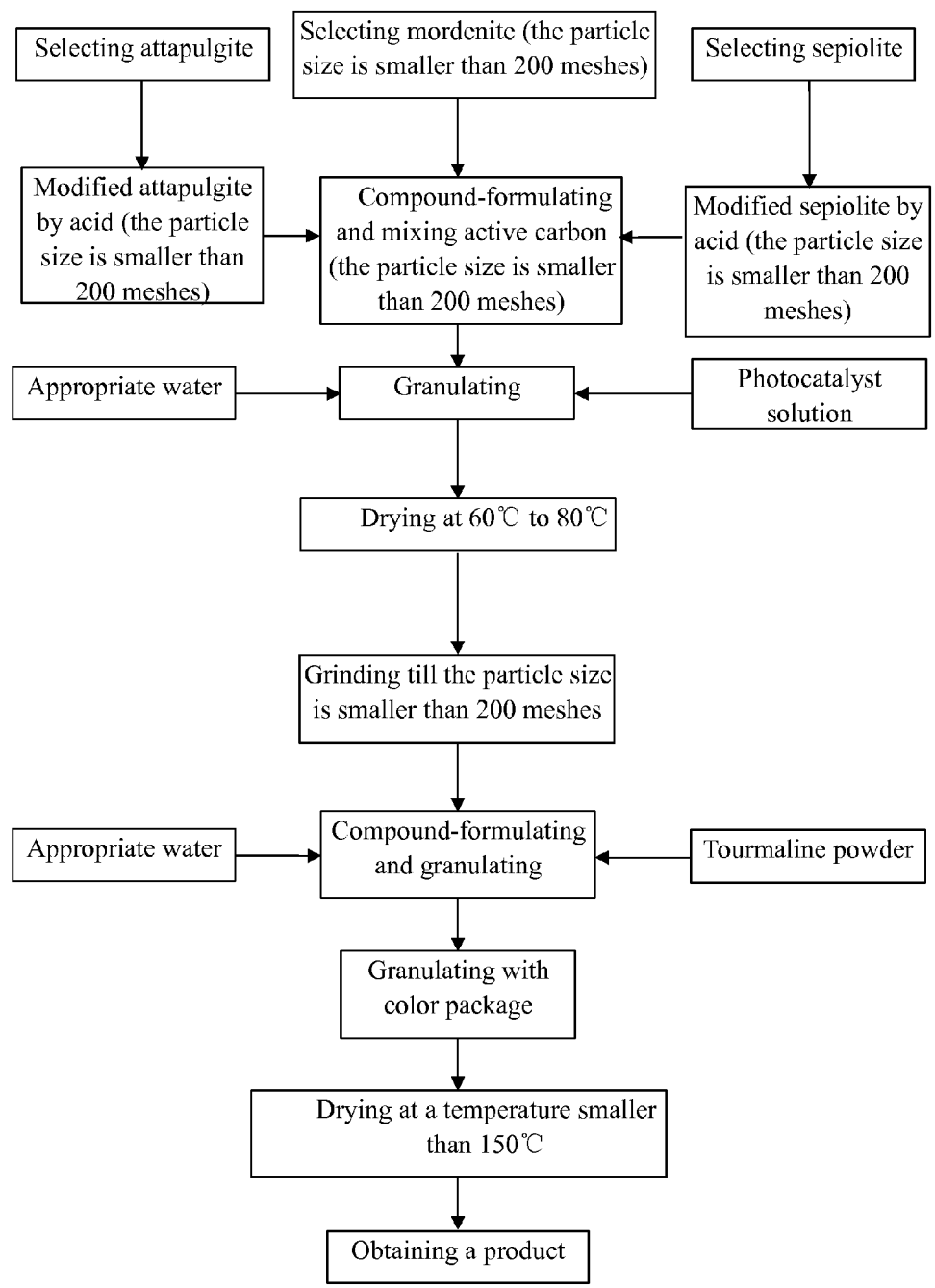

METHOD FOR MANUFACTURING PHOTOCATALYST MULTIFUNCTIONAL DUST-FREE ACTIVE CARBON COLOR BALL

BACKGROUND OF THE PRESENT INVENTION

1. Field of Invention

The present invention relates to a method for manufacturing the active carbon air purification product, and more particularly to a method for manufacturing photocatalyst multifunctional dust-free active carbon color ball which is adapted for indoor air pollution control and purification.

2. Description of Related Arts

Active carbon is a kind of carbon-based adsorption material with abundant pore structure and huge specific surface area. It has some characteristics, such as strong adsorption capacity, good chemical stability, high mechanical strength, and easy regeneration, and is widely used in industry, agriculture, national defense, transportation, medicine and health, environmental protection and other fields. With the development of society and improvement of living standards, the demand for active carbon has been on the rise in recent years. Especially in recent years, with the ever-increasing requirement of human being's survival environmental protection, more and more active carbons have been required at home and abroad. Moreover, with the improvement of people's environmental protection consciousness and demand standard, the higher and broader demand for the performance of active carbon has been made. Therefore, the new development of application performance of active carbon is needed.

In prior art, the activating treatment of active carbon increases the microporous surface of active carbon for improving the adsorption property thereof. China patent application No. 00105398.1, entitled "Coated Active Carbon", discloses a material combination containing active carbon, wherein the active carbon shows the initial, pre-coating butane activity and butane working ability, and its surface is coated with a layer of continuous polymer membrane which is adapted for basically eliminating the material loss of active carbon caused by dust, wherein coated active carbon material shows that the last, after-coating butane activity and butane working ability are at least 90% of the initial, pre-coating butane activity and butane working ability respectively. This invention can avoid the product loss caused by active carbon pulverization and other commonly seen problems which relate to the final use of product.

Active carbon is an adsorption material using carbon as the main ingredient, and has a complicated structure. It is not like graphite and diamond to have the molecular structure with carbon atoms arranged in a regular pattern. Also, it is not like carbonaceous matter to have the complicated macromolecular structure. It is generally believed that active carbon has a pore structure which is formed by arranging microcrystalline similar to graphite in accordance with the whorl-shaped structure and strongly cross-linking among microcrystallines. The pore structure of active carbon relates to raw materials and production processes. The pore of active carbon is made up of macropore, mesopore and micropore. The diameter of the macropore is in the range of 50 nm and 200 nm, that of the mesopore is in the range of 2 nm and 50 nm, and that of micropore is smaller than 2 nm. The above pore diameters will adsorb the corresponding molecular sizes respectively. If the molecular size is larger than the pore diameter, the molecule will not enter the pore due to the molecular function, so there is no adsorption function. If the molecular size is approximately equal to the pore diameter, the molecular diameter corresponds to the pore diameter, so the adsorbent strongly captures the adsorption molecules, which is adapted for adsorbing at low concentration. If the molecular size is far less than the pore diameter, the adsorbed molecule is easily desorbed, has a rapid desorption speed and a small amount of adsorption at low concentration. Therefore, considering the adsorption performance, the actual size of microporous adsorbent should be equal to gas phase adsorption molecule size or smaller than micropore diameter.

Accordingly, it is not difficult for us to know the reason, that the adsorption ability active carbon acting on water molecule, benzene, ammonia and other harmful toxic small molecules is weak, is fewer micropores have the diameter smaller than 1 nm. The diameter of micropore of common active carbon is generally in the range of 1 nm and 2 nm, and the number of micropores is about ⅓ of that of total pores. However, this micropore diameter is too large for the small molecule with the diameter of 0.2 nm to 0.6 nm. Therefore, common active carbon, weakly adsorbing water molecules, benzene, ammonia and other harmful toxic small molecules, is difficult to develop in indoor air purification.

SUMMARY OF THE PRESENT INVENTION

An object of the present invention is to provide a method for manufacturing photocatalyst multifunctional dust-free active carbon color ball which is capable of strongly adsorbing formaldehyde, benzene, ammonia, sulfur dioxide, carbon monoxide and other harmful toxic polar molecules, and expanding the originally single adsorption function of active carbon to adsorption, decomposition, releasing negative ions, emitting far infrared multiple functions.

Accordingly, in order to accomplish the above object, the present invention provides a method for manufacturing photocatalyst multifunctional dust-free active carbon color ball, comprising the steps of:

(1) compound-formulating and mixing 8%-15% attapulgite, 8%-15% sepiolite, 5%-10% mordenite and 50%-65% active carbon;

(2) after step (1), granulating by adding 5%-10% photocatalyst and appropriate water and mixing;

(3) after step (2), drying at 60° C.-80° C. and then grinding till the particle size is smaller than 200 meshes;

(4) after step (3), compound-formulating and granulating by adding 5%-10% tourmaline powder and appropriate water; and (5) after step (4), obtaining a product by drying at 150° C., wherein the percentage of every raw material is expressed by weight.

Preferably, in step (1), the attapulgite is modified by acid and then is ground till the particle size is smaller than 200 meshes.

Preferably, in step (1), the mordenite and active carbon are ground till the particle size is smaller than 200 meshes respectively.

Preferably, in step (1), the sepiolite is modified by acid and then is ground till the particle size is smaller than 200 meshes.

Preferably, in step (4), granulating is granulating with color package.

Preferably, in step (1), the attapulgite is 12%, the sepiolite is 12%, the mordenite is 8% and the active carbon is 52%; in step (2), the photocatalyst is 8%; and in step (4), the tourmaline powder is 8%.

Preferably, in step (1), the attapulgite is 10%, the sepiolite is 10%, the mordenite is 6% and the active carbon is 60%; in step (2), the photocatalyst is 6%; and in step (4), the tourmaline powder is 8%.

Preferably, in step (1), the attapulgite is 15%, the sepiolite is 15%, the mordenite is 10% and the active carbon is 50%; in step (2), the photocatalyst is 5%; and in step (4), the tourmaline powder is 5%.

Preferably, in step (1), the attapulgite is 8%, the sepiolite is 8%, the mordenite is 5% and the active carbon is 59%; in step (2), the photocatalyst is 10%; and in step (4), the tourmaline powder is 10%.

Compared with prior art, in the method for manufacturing photocatalyst multifunctional dust-free active carbon color ball of the present invention, modified attapulgite and sepiolite by acid, active carbon, and mordenite are compound-formulated. Modified attapulgite and sepiolite by acid increase the partial pore diameter of photocatalyst multifunctional dust-free active carbon color ball to be more than 1 nm, and remains the macropores and mesopores for effectively adsorbing benzene, xylene, formaldehyde, carbon monoxide, sulfur dioxide, ammonia and other harmful toxic polar molecules in the air. In the compound-formulating process of the photocatalyst multifunctional dust-free active carbon color ball, active carbon is organically combined with tourmaline powder and photocatalyst, so that the photocatalyst multifunctional dust-free active carbon color ball has multiple functions of adsorption, decomposition, releasing negative ions and emitting far infrared, instead of originally single adsorption function of active carbon. Furthermore, the present invention has the color granular appearance made by high-tech, so that there is no dark and dirty feeling for users. The present invention is adapted for the air treatment and purification of families, hospitals and various public indoor occasions.

These and other objectives, features, and advantages of the present invention will become apparent from the following detailed description, the accompanying drawings, and the appended claims.

BRIEF DESCRIPTION OF THE DRAWINGS

The drawing is a process flow diagram of a method for manufacturing photocatalyst multifunctional dust-free active carbon color ball according to a preferred embodiment of the present invention.

DETAILED DESCRIPTION OF THE PREFERRED EMBODIMENT

The present invention is further detailedly explained with the accompanying drawing.

The drawing is a process flow diagram of a method for manufacturing photocatalyst multifunctional dust-free active carbon color ball of the present invention.

A method for manufacturing photocatalyst multifunctional dust-free active carbon color ball of the present invention comprises the steps of:

(1) compound-formulating and mixing 8%-15% attapulgite, 8%-15% sepiolite, 5%-10% mordenite and 50%-65% active carbon;

(2) after step (1), granulating by adding 5%-10% photocatalyst and appropriate water and mixing;

(3) after step (2), drying at 60° C.-80° C. and then grinding till the particle size is smaller than 200 meshes;

(4) after step (3), compound-formulating and granulating by adding 5%-10% tourmaline powder and appropriate water; and (5) after step (4), obtaining a product by drying at 150° C., wherein the percentage of every raw material is expressed by weight.

In nature's natural nano-minerals, such as attapulgite, sepiolite and mordenite, there are highly developed lattice voids within crystals thereof which have selective adsorption function similar to molecular sieve. The pore diameter within the crystal is in the range of 0.3 nm and 0.7 nm. In the present invention, modifying attapulgite and sepiolite mineral by acid to increase the partial pore diameter of the made-up photocatalyst multifunctional dust-free active carbon color ball to be more than 1 nm. The rank order of the molecular size of the main organic pollutants and chemical pollutants commonly existing in indoor air is benzene, xylene, formaldehyde, carbon monoxide, sulfur dioxide, ammonia, which are in the range of 6.8 Å and 2.7 Å. Therefore, the treated attapulgite, sepiolite and other natural nano-minerals compound-formulates with active carbon for powerfully selective adsorbing the above harmful toxic polar molecules. The rank order of adsorption ability is water>alcohol>aldehyde>ketone>olefin>neutral lipid>arene>naphthenic hydrocarbon>alkane.

The activating treatment of active carbon increases the microporous surface of active carbon for improving the adsorption property thereof. In the method for manufacturing photocatalyst multifunctional dust-free active carbon color ball of the present invention, active carbon is compound-formulated with attapulgite, sepiolite, and mordenite for effectively increasing the microporous surface of active carbon, improving the selective adsorption capacity of active carbon and remaining macropores and mesopores of active carbon, so that the photocatalyst multifunctional dust-free active carbon color ball can strongly adsorb formaldehyde, benzene, ammonia, sulfur dioxide, carbon monoxide and other harmful toxic polar molecules, simultaneously, reduce energy consumption and production cost, decrease the emissions of various harmful toxic substances while producing active carbon. Therefore, the present invention is a very practical and low-carbon technology.

To play a better and wider role in the treatment and purification of indoor air pollution, active carbon is not only compositely made with attapulgite, sepiolite and other nano-minerals, but also organically combined with tourmaline powder in the composite compatibility production of the photocatalyst multifunctional dust-free active carbon color ball, so that the photocatalyst multifunctional dust-free active carbon color ball has the environmental protection function and healthy function.

Tourmaline contains eleven kinds of minerals and trace elements, such as sodium, magnesium, iron, manganese, lithium, aluminum, boron, silicon, oxygen, hydrogen, and fluorine, wherein iron, aluminum, silicon and fluorine are essential trace elements. Magnesium, iron, fluorine and boron in the human body play a significant physiological function and special function.

The photocatalyst multifunctional dust-free active carbon color ball of the present invention expands the single adsorption function of active carbon to multiple functions, such as adsorbing, decomposing, releasing negative ions and emitting far infrared. Furthermore, the present invention has the color granular appearance made by high-tech for avoiding the dark and dirty appearance of original active carbon, so it is adapted for air treatment and purification of families, hospitals and various public indoor occasions.

EXAMPLE 1

A method for manufacturing photocatalyst multifunctional dust-free active carbon color ball according to a first preferred embodiment of the present invention is illustrated, wherein the method comprises the steps of:

(1) modifying attapulgite and sepiolite by acid, grinding the modified attapulgite and sepiolite till the particle size is smaller than 200 meshes respectively, grinding mordenite and active carbon till the particle size is smaller than 200 meshes respectively, compound-formulating and mixing 12% ground attapulgite, 12% ground sepiolite, 8% ground mordenite and 52% ground active carbon;

(2) after step (1), granulating by adding 8% photocatalyst and appropriate water and mixing;

(3) after step (2), drying the semi-product at 60° C.-80° C. and grinding the dried semi-product till the particle size is smaller than 200 meshes;

(4) after step (3), compound-formulating and granulating with color package by adding 8% tourmaline powder and appropriate water; and (5) after step (4), drying at 150° C. and obtaining a product, wherein the percentage of every raw material is expressed by weight.

EXAMPLE 2

A method for manufacturing photocatalyst multifunctional dust-free active carbon color ball according to a second preferred embodiment of the present invention is illustrated, wherein the method comprises the steps of:

(1) modifying attapulgite and sepiolite by acid, grinding the modified attapulgite and sepiolite till the particle size is smaller than 200 meshes respectively, grinding mordenite and active carbon till the particle size is smaller than 200 meshes respectively, compound-formulating and mixing 10% ground attapulgite, 10% ground sepiolite, 6% ground mordenite and 60% ground active carbon;

(2) after step (1), granulating by adding 6% photocatalyst and appropriate water and mixing;

(3) after step (2), drying the semi-product at 60° C.-80° C. and grinding the dried semi-product till the particle size is smaller than 200 meshes;

(4) after step (3), compound-formulating and granulating with color package by adding 8% tourmaline powder and appropriate water; and (5) after step (4), drying at 150° C. and obtaining a product, wherein the percentage of every raw material is expressed by weight.

EXAMPLE 3

A method for manufacturing photocatalyst multifunctional dust-free active carbon color ball according to a third preferred embodiment of the present invention is illustrated, wherein the method comprises the steps of:

(1) modifying attapulgite and sepiolite by acid, grinding the modified attapulgite and sepiolite till the particle size is smaller than 200 meshes respectively, grinding mordenite and active carbon till the particle size is smaller than 200 meshes respectively, compound-formulating and mixing 15% ground attapulgite, 15% ground sepiolite, 10% ground mordenite and 50% ground active carbon;

(2) after step (1), granulating adding 5% photocatalyst and appropriate water and mixing;

(3) after step (2), drying the semi-product at 60° C.-80° C. and grinding the dried semi-product till the particle size is smaller than 200 meshes;

(4) after step (3), compound-formulating and granulating with color package by adding 5% tourmaline powder and appropriate water; and (5) after step (4), drying at 150° C. and obtaining a product, wherein the percentage of every raw material is expressed by weight.

EXAMPLE 4

A method for manufacturing photocatalyst multifunctional dust-free active carbon color ball according to a first preferred embodiment of the present invention is illustrated, wherein the method comprises the steps of:

(1) modifying attapulgite and sepiolite by acid, grinding the modified attapulgite and sepiolite till the particle size is smaller than 200 meshes respectively, grinding mordenite and active carbon till the particle size is smaller than 200 meshes respectively, compound-formulating and mixing 8% ground attapulgite, 8% ground sepiolite, 5% ground mordenite and 59% ground active carbon;

(2) after step (1), granulating by adding 10% photocatalyst and appropriate water and mixing;

(3) after step (2), drying the semi-product at 60° C.-80° C. and grinding the dried semi-product till the particle size is smaller than 200 meshes;

(4) after step (3), compound-formulating and granulating with color package by adding 10% tourmaline powder and appropriate water; and (5) after step (4), drying at 150° C. and obtaining a product, wherein the percentage of every raw material is expressed by weight.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for manufacturing photocatalyst multifunctional dust-free active carbon color ball, comprising the steps of:
   (1) mixing 8%-15% attapulgite, 8%-15% sepiolite, 5%-10% mordenite and 50%-65% active carbon;
   (2) after step (1), granulating by adding 5%-10% photocatalyst and water and mixing;
   (3) after step (2), drying at 60° C.-80° C. and then grinding till the particle size is smaller than 200 meshes;
   (4) after step (3), granulating by adding 1 5%-10% tourmaline powder and water; and
   (5) after step (4), obtaining a product by drying at 150° C., wherein the percentage of every raw material is expressed by weight.

2. The method, as recited in claim 1, wherein in step (1), the attapulgite is modified by acid and then is ground till the particle size is smaller than 200 meshes.

3. The method, as recited in claim 1, wherein in step (1), the mordenite and active carbon are ground till the particle size is smaller than 200 meshes respectively.

4. The method, as recited in claim 2, wherein in step (1), the mordenite and active carbon are ground till the particle size is smaller than 200 meshes respectively.

5. The method, as recited in claim 1, wherein in step (1), the sepiolite is modified by acid and then is ground till the particle size is smaller than 200 meshes.

6. The method, as recited in claim 4, wherein in step (1), the sepiolite is modified by acid and then is ground till the particle size is smaller than 200 meshes.

7. The method, as recited in claim 1, wherein in step (4), granulating is colorfully packaged.

8. The method, as recited in claim 6, wherein in step (4), granulating is colorfully packaged.

9. The method, as recited in claim 1, in step (1), the attapulgite is 12%, the sepiolite is 12%, the mordenite is 8% and the active carbon is 52%; in step (2), the photocatalyst is 8%; and in step (4), the tourmaline powder is 8%.

10. The method, as recited in claim 7, in step (1), the attapulgite is 12%, the sepiolite is 12%, the mordenite is 8% and the active carbon is 52%; in step (2), the photocatalyst is 8%; and in step (4), the tourmaline powder is 8%.

11. The method, as recited in claim 8, in step (1), the attapulgite is 12%, the sepiolite is 12%, the mordenite is 8% and the active carbon is 52%; in step (2), the photocatalyst is 8%; and in step (4), the tourmaline powder is 8%.

12. The method, as recited in claim 1, in step (1), the attapulgite is 10%, the sepiolite is 10%, the mordenite is 6% and the active carbon is 60%; in step (2), the photocatalyst is 6%; and in step (4), the tourmaline powder is 8%.

13. The method, as recited in claim 7, in step (1), the attapulgite is 10%, the sepiolite is 10%, the mordenite is 6% and the active carbon is 60%; in step (2), the photocatalyst is 6%; and in step (4), the tourmaline powder is 8%.

14. The method, as recited in claim 8, in step (1), the attapulgite is 10%, the sepiolite is 10%, the mordenite is 6% and the active carbon is 60%; in step (2), the photocatalyst is 6%; and in step (4), the tourmaline powder is 8%.

15. The method, as recited in claim 1, wherein in step (1), the attapulgite is 15%, the sepiolite is 15%, the mordenite is 10% and the active carbon is 50%; in step (2), the photocatalyst is 5%; and in step (4), the tourmaline powder is 5%.

16. The method, as recited in claim 7, wherein in step (1), the attapulgite is 15%, the sepiolite is 15%, the mordenite is 10% and the active carbon is 50%; in step (2), the photocatalyst is 5%; and in step (4), the tourmaline powder is 5%.

17. The method, as recited in claim 8, wherein in step (1), the attapulgite is 15%, the sepiolite is 15%, the mordenite is 10% and the active carbon is 50%; in step (2), the photocatalyst is 5%; and in step (4), the tourmaline powder is 5%.

18. The method, as recited in claim 1, wherein in step (1), the attapulgite is 8%, the sepiolite is 8%, the mordenite is 5% and the active carbon is 59%; in step (2), the photocatalyst is 10%; and in step (4), the tourmaline powder is 10%.

19. The method, as recited in claim 7, wherein in step (1), the attapulgite is 8%, the sepiolite is 8%, the mordenite is 5% and the active carbon is 59%; in step (2), the photocatalyst is 10%; and in step (4), the tourmaline powder is 10%.

20. The method, as recited in claim 8, wherein in step (1), the attapulgite is 8%, the sepiolite is 8%, the mordenite is 5% and the active carbon is 59%; in step (2), the photocatalyst is 10%; and in step (4), the tourmaline powder is 10%.

* * * * *